United States Patent [19]
Kemper

[11] 4,116,120
[45] Sep. 26, 1978

[54] CONVERTIBLE DOUGH MAKEUP LINE FOR THE PRODUCTION OF DIFFERENT KINDS OF BREAD

[76] Inventor: Kate Kemper, Wybüelstrasse 6, 8702 Zürich-Zollikon, Switzerland

[21] Appl. No.: 726,530

[22] Filed: Sep. 27, 1976

[51] Int. Cl.² .............................................. A23C 3/02
[52] U.S. Cl. ...................................... 99/483; 99/353; 99/443 C
[58] Field of Search ................. 99/353, 386, 404, 423, 99/443 R, 443 C, 468, 483, 473, 478; 198/366, 369, 424, 601, 622, 631; 425/305 R, 364 R, 371; 34/203, 205; 426/496, 500, 503

[56] References Cited

U.S. PATENT DOCUMENTS

| | | | |
|---|---|---|---|
| 2,883,033 | 4/1959 | Armstrong | 198/601 |
| 3,111,913 | 11/1963 | Mládek | 99/353 |

FOREIGN PATENT DOCUMENTS 1,009,123  5/1957  Fed. Rep. of Germany ............ 99/353

*Primary Examiner*—Harvey C. Hornsby
*Assistant Examiner*—Arthur O. Henderson
*Attorney, Agent, or Firm*—Joseph A. Geiger

[57] ABSTRACT

A convertible dough makeup line for the selective production of flat bread, loaf bread, or round bread in several simultaneously moving rows of dough pieces, the line having consecutive first and second dough piece molding lines with an upwardly pivotable conveyor unit arranged therebetween and a conveyor for the loading of loaves or round dough pieces arranged underneath the pivotable conveyor unit, the second dough piece molding line, used for the molding of flat dough pieces, consisting of a longitudinal line and a transverse line, each with rolling stations, including a right-angle transfer device between the two lines.

15 Claims, 9 Drawing Figures

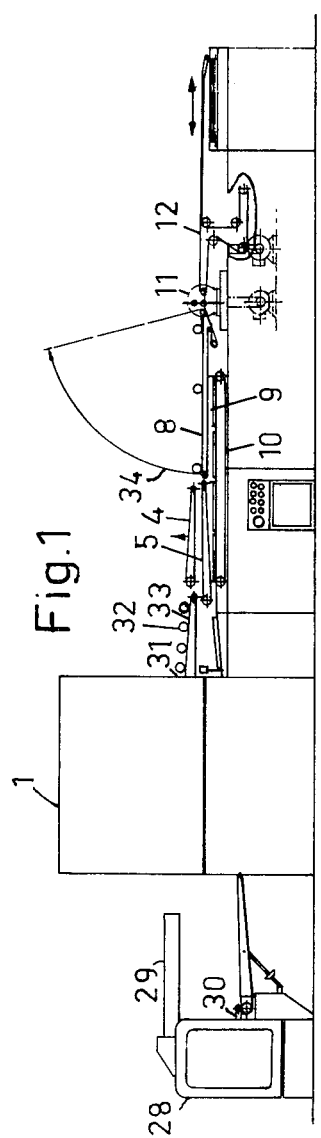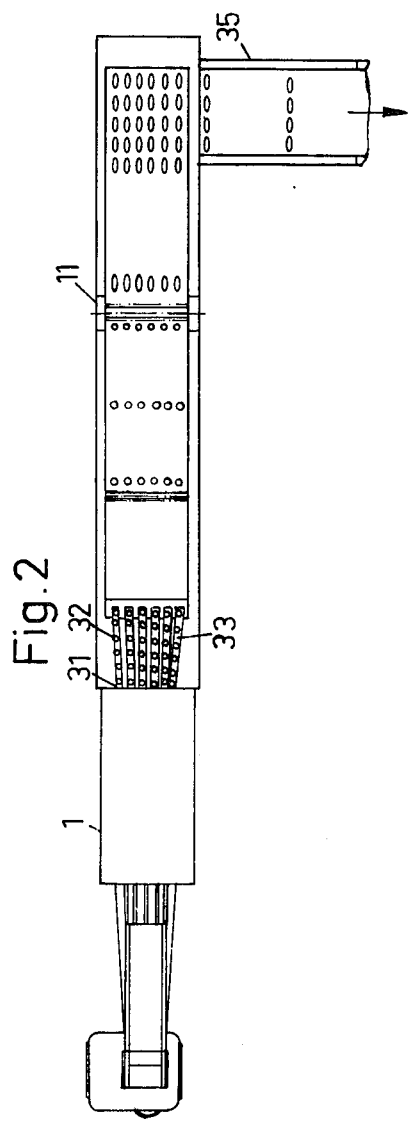

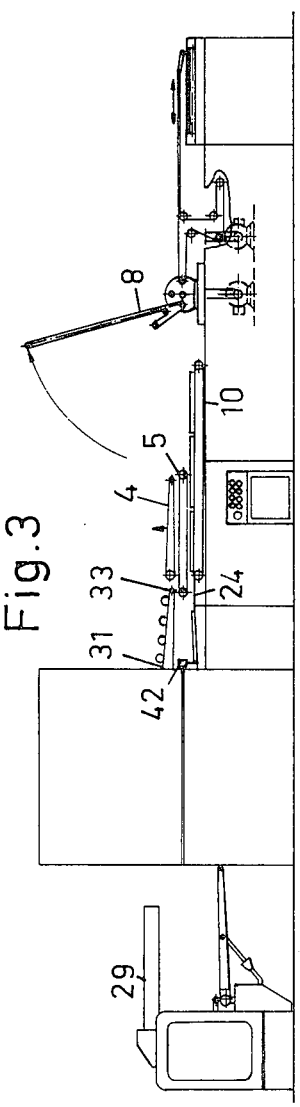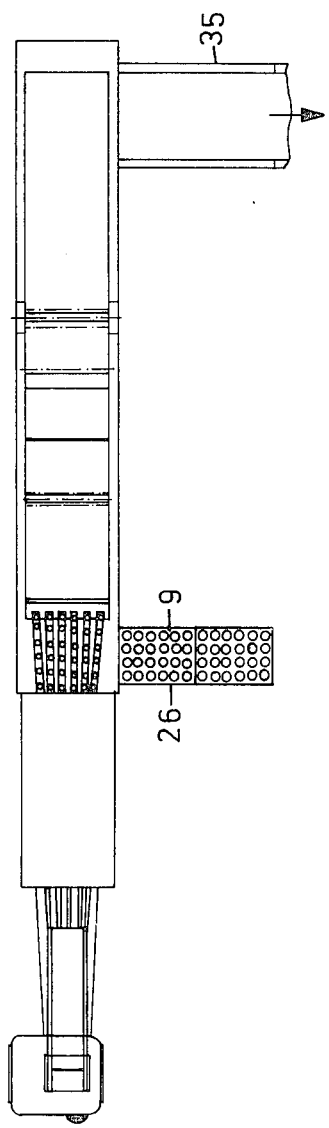

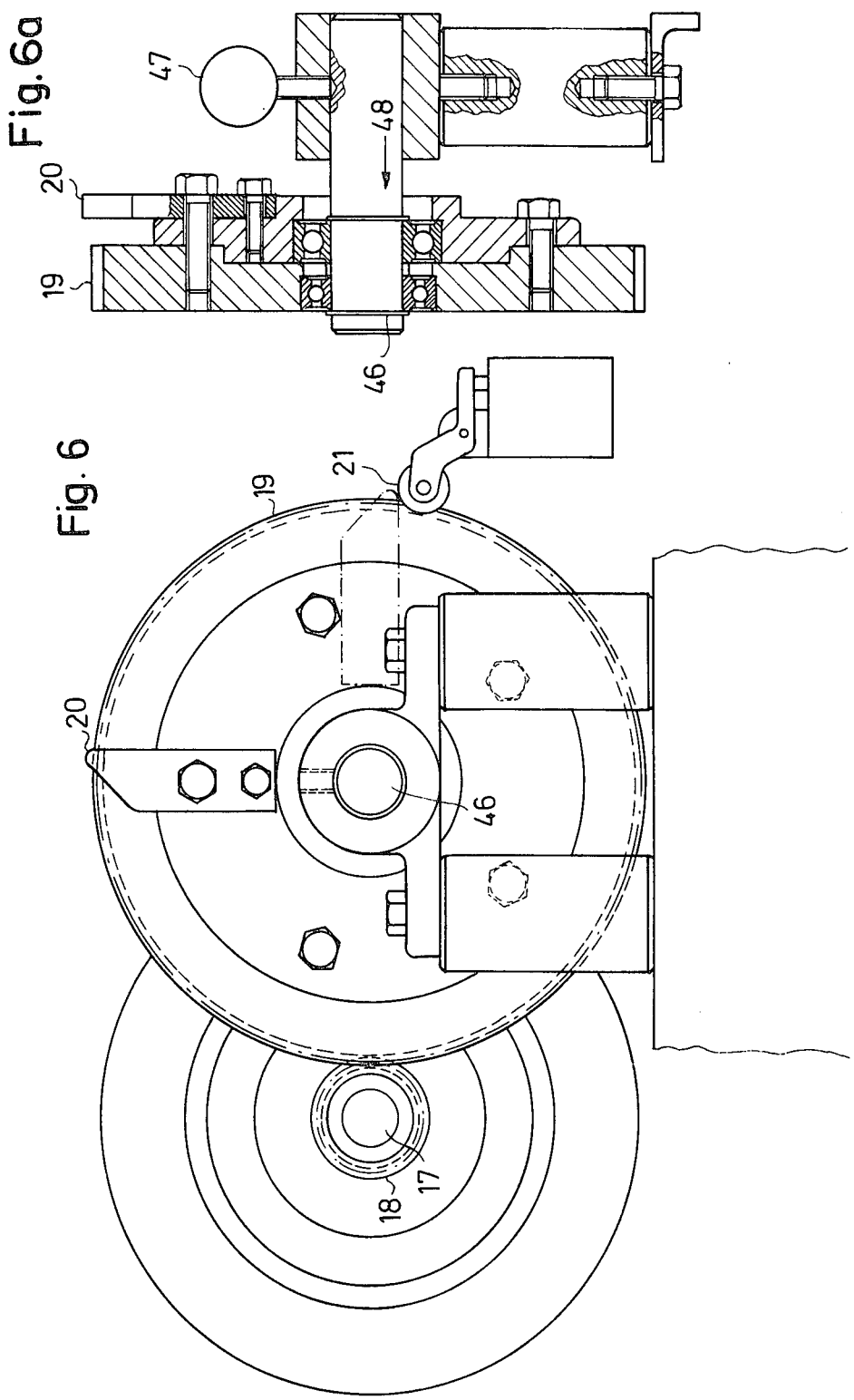

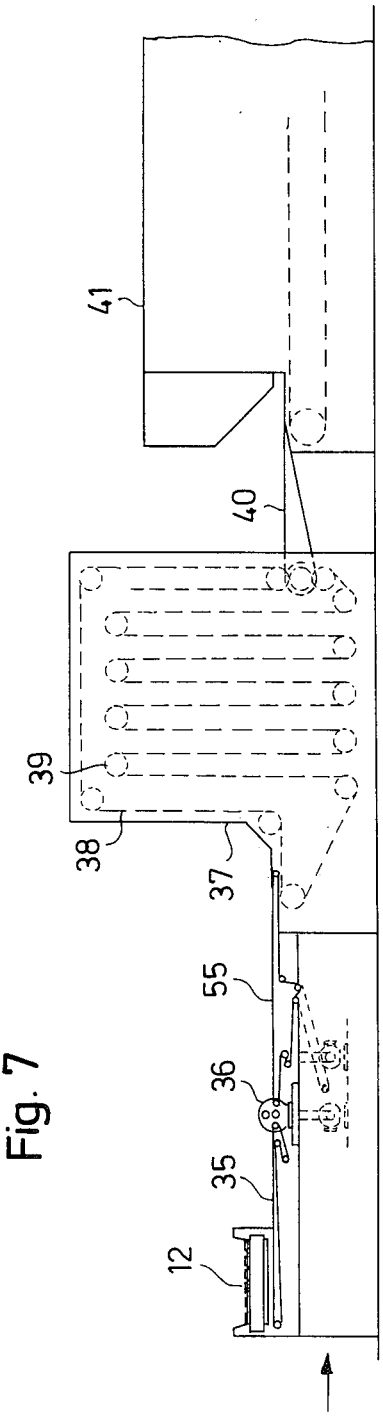
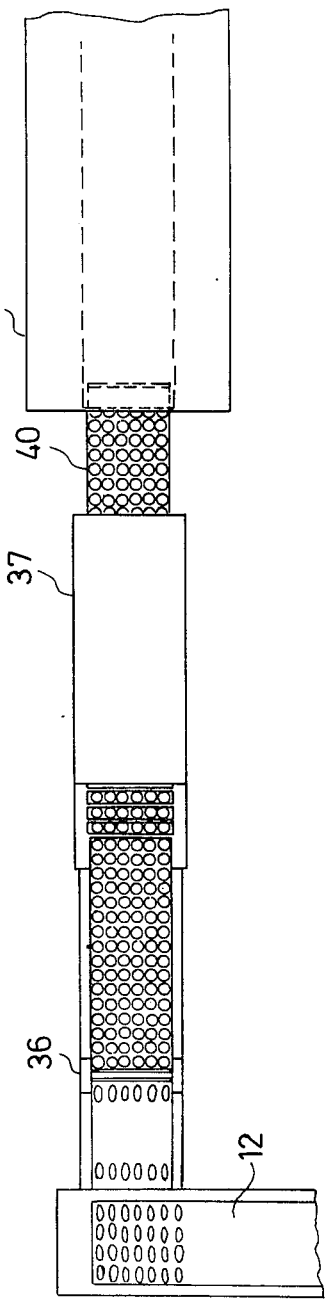

CONVERTIBLE DOUGH MAKEUP LINE FOR THE PRODUCTION OF DIFFERENT KINDS OF BREAD

BACKGROUND OF THE INVENTION

1. Field of the Invention

The present invention relates to mechanized bakery equipment, and more particularly to machinery for the automatic selective makeup of bread dough into one of several dough piece shapes for subsequent baking in a continuous baking operation, the machinery being readily convertible from one dough piece shape to another, without modification.

2. Description of the Prior Art

Bread or bread-like products have historically been by far the most important of all food staples. The growing mobility of large segments of population from one region to another and from one country to another has brought about corresponding changes in the bread eating habits of local consumer groups, the changing habits reflected themselves in a considerably wider variety of types of breads being in demand.

The bread producers, desirous to respond to this changing demand pattern, are being forced to offer a much greater variety of bread products than in the past. But, the desired to offer a greater variety of bread products is in direct conflict with the increasing need for mechanization of all bakery operations, in order to reduce production costs. Obviously, the mechanization of bread production is only then economical, when the automatic equipment is in use on a continuous basis. In the past, this meant that only one kind of bread could be produced economically on a continuous basis.

Known mechanized dough makeup equipment is normally arranged in line with a continuously operating baking oven, forming a processing line for one particular bread shape, loaves, or round bread, or flat bread. Such a dough makeup line starts with a dough divider at the beginning of the line, into which the mixed dough is loaded batch by batch. The dough pieces produced by the dough divider pass through a dough piece rounder, and from there to a fermenting unit, or so-called proofer, where they are left to rest to redevelop the gas content lost during rounding. Following proofing, the dough pieces undergo a molding operation, as they pass through suitable molding or shaping equipment. The latter may include stretch-molding and/or roll-molding equipment. The shaped dough pieces are then transferred to baking pallets or baking pans which carry them into a tunnel oven.

Such a mechanized dough makeup line does not offer the possibility of quickly converting the bread production to a different bread shape, like switching from the production of loaves to flat bread, or to round bread, for example. Extensive modifications would be necessary for such a switch, and these modifications would involve a prolonged disruptive shutdown of all the equipment, besides requiring highly skilled special personnel for this purpose.

The different kinds of bread which are to be produced differ not only in terms of the types of flour used, they also call for widely differing weights and shapes. For instance, while the general preference in central and northern Europe goes to long bread, such as rolled or pan loaves, southern countries have a preference for flat breads, for example.

In my co-pending U.S. patent application Ser. No. 669,098, filed Mar. 22, 1976, I am disclosing a dough makeup line for the selective mechanized production of long bread and flat bread. This dough makeup line uses two parallel arranged longitudinal dough piece molding lines equipped with appropriate adjustable molding stations for the different bread shapes. One or the other of the two molding lines is selectively operable, and both lines feed their output to a common transverse dough piece molding line which leads to a baking palette loading station, from where the molded dough pieces are fed to the baking oven.

SUMMARY OF THE INVENTION

Underlying the present invention is the primary objective of devising an improved dough makeup line of simplified construction, which is adapted for selectively producing loaf-shaped bread, round bread and flat bread, the equipment being readily convertible from the makeup configuration of one kind of bread to that of another.

The present invention proposes to attain this objective by suggesting a convertible dough makeup line in which the proofed pieces are fed to a single lingitudinal molding line which includes a displaceable conveyor unit, preferably an upwardly pivotable endless conveyor belt, whose position connects or disconnects a flat bread molding line with several rolling stations and an intermediate right-angle dough piece transfer device. In its raised position, the pivotable conveyor unit disconnects the aforementioned flat bread molding line, causing the dough pieces to be discharged onto baking palettes on a chain conveyor which is arranged underneath the longitudinal dough piece molding line and which moves in a different direction, towards a palette transfer station. The dough piece molding unit which discharges the proofed dough pieces either onto a pivotable conveyor belt, if the latter is lowered, or onto the baking palettes on the chain conveyor, if the pivotable conveyor belt is raised, is preferably a molding conveyor having a counter-travelling upper molding belt cooperating with a lower molding belt, the upper belt being vertically adjustable to either premold the dough pieces for the flat bread molding line, or to finish-mold loaf bread which is then immediately deposited on baking palettes. Only in the case of round bread is the upper conveyor raised to such an extent that no molding action takes place.

In a preferred embodiment of the invention, the chain conveyor, carrying baking palettes for loaf bread, is arranged in longitudinal alignment with the main longitudinal molding line, underneath the latter, and running in opposite direction, i.e. back towards the proofing unit from where the proofed dough pieces are discharged onto the main molding line. A palette transfer station, arranged adjacent to the proofing unit, receives the loaded palettes from the chain conveyor, via a friction roller drive. Suitable switches control the drive of a transversely oriented palette conveyor for the removal of the loaf-carrying palettes to a pan proofer, or directly to the baking oven.

The preferred embodiment of the invention further suggests a configuration of the makeup line behind the gate-like pivotable conveyor unit as a flat bread molding line. The latter consists primarily of a first rolling station arranged behind the pivotable conveyor, followed by a right-angle dough piece transfer station cooperating with a transversely running molding line, and at least one rolling station arranged on the latter. The two flat bread rolling stations, which are thus oriented at right angles to one another, produce a substantially circular flat bread shape, provided the rolling stations in the two movement directions are adjusted appropriately. Other adjustments will produce flat bread of an oval shape, if desired. The longitudinal main molding line and the cooperating transverse molding line are preferably so adjusted that several parallel rows of dough pieces travel simultaneously along the two dough piece molding lines. The right-angle dough piece transfer device between the two flat-shape molding lines is accordingly equipped to simultaneously deposit a number of semi-molded dough pieces onto a conveyor of the transverse molding line, which may carry an equal or different number of rows of dough pieces side by side.

The invention further suggests that the various constituent units of the dough piece makeup line be interconnected by mechanical drive connections, for synchronized motion of the various conveyors, dough piece molding devices and transfer devices. For this purpose, the preferred embodiment of the invention suggests a main drive shaft extending longitudinally underneath the longitudinal main dough piece molding line and carrying several disconnectable drive couplings for the selective connection or disconnection of certain operational units to the main shaft. A phase-true drive connection, where necessary, is obtained by providing dog-type couplings which connect only at one specific point within a 360° angle.

The drive for the transverse molding line is preferably likewise derived from the earlier-mentioned main drive shaft, using a transverse drive shaft and a suitable connecting bevel gear drive. The transverse drive shaft is used to control the right-angle dough piece transfer device, using a gear-driven control disc and a limit switch carried by the latter for the correct sequencing of the transfer device, in accordance with the number of rows of dough pieces which are to be deposited on the transverse molding line. The drive for the control disc of the transfer device is also angularly resettable by means of a suitable coupling, and the control disc itself is readily interchangeable against a different disc, should a change in the dough piece transfer pattern be desired.

BRIEF DESCRIPTION OF THE DRAWINGS

Further special features and advantages of the invention will become apparent from the description following below, when taken together with the accompanying drawings which illustrate, by way of example, a preferred embodiment of the invention, represented in the various figures as follows:

FIG. 1 represents an elevational side view of a convertible dough makeup line embodying the invention, as used in conjunction with a divider/rounder head unit;

FIG. 2 shows the dough makeup line of FIG. 1 in a plan view;

FIG. 3 shows the dough makeup line of FIG. 1 in a different operational configuration.

FIG. 4 is a plan view of FIG. 3;

FIG. 6 is a further enlarged representation of certain control components of the right-angle dough piece transfer device of FIG. 5;

FIG. 6a shows the components of FIG. 6 in a transverse cross-section;

FIG. 7 is an elevational view of the transverse molding line of the embodiment of FIGS. 1-4, showing additional associated processing units; and FIG. 8 is a plan view of the equipment shown in FIG. 7.

DESCRIPTION OF THE PREFERRED EMBODIMENT

Figure 5:
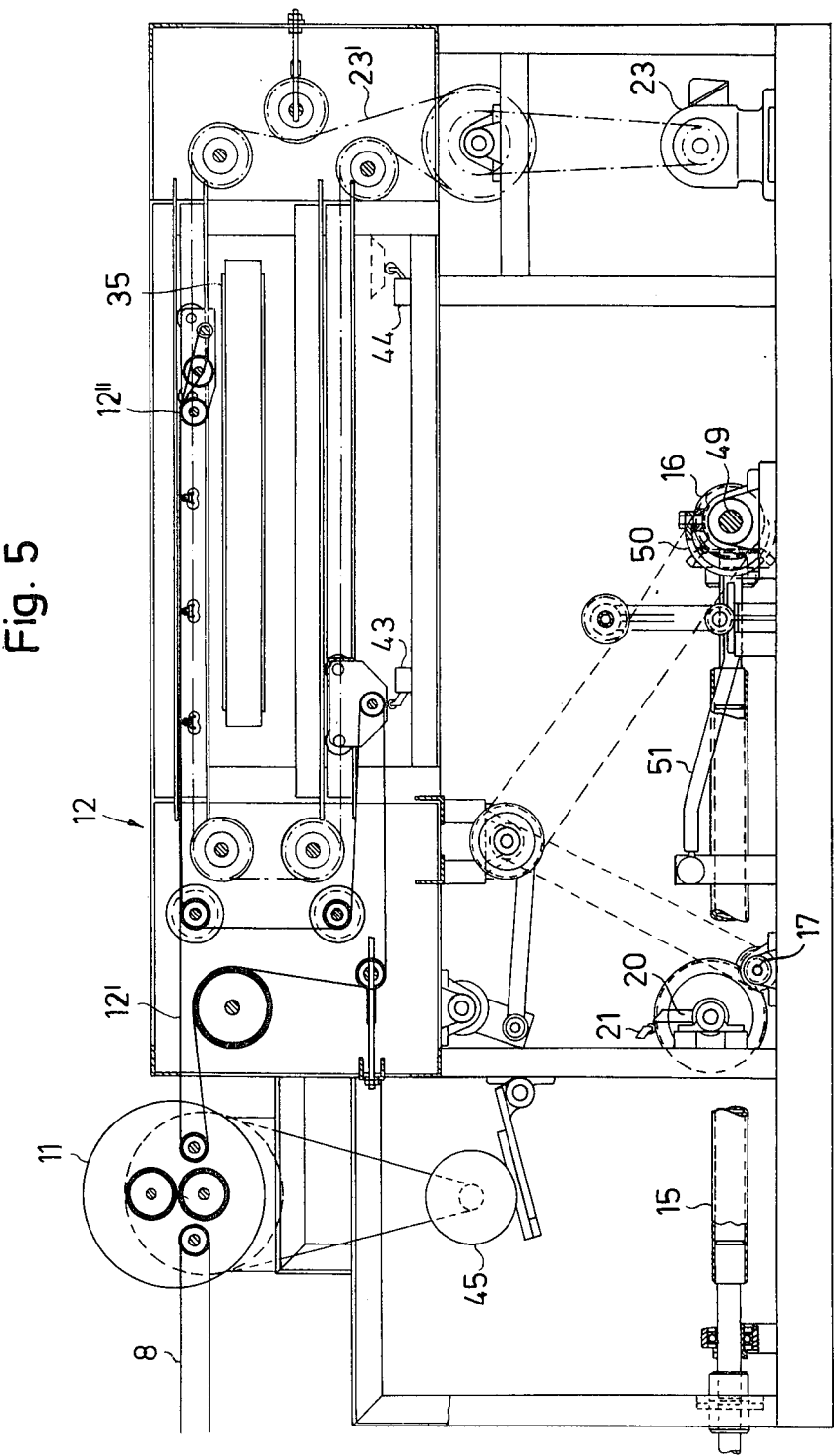
FIG. 5 shows, at an enlarged scale, a right-angle dough piece transfer device and an associated rolling station, as used in the dough makeup line of FIGS. 1-4.

In FIGS. 1 and 2 of the drawing is schematically illustrated a portion of a mechanized dough makeup line embodying the present invention, the remainder of the line being shown in FIGS. 7 and 8. At the start of the line is arranged a head unit 28 with a dough intake station 29 onto which mixed dough, coming from a dough kneading machine, is deposited by means of a mechanical dough loader or by hand. The head unit 28 consists essentially of a combination of a dough divider and a dough piece rounder, which may both be of conventional design.

A dough piece delivery station 30 discharges a steady flow of rounded dough pieces onto a diverging conveyor section, from where the dough pieces move into a rest zone which, in the preferred embodiment, is a proofing cabinet 1. There, the dough pieces are allowed to redevelop, through rest and fermentation, the gas content which they had lost in the rounding operation. Inside the proofing cabinet 1, the dough pieces are held in suitable dough pockets of a suspended endless proofing train which slowly moves through the proofing cabinet.

The dough pieces 32 which leave the proofing cabinet 1 over its discharge station 31 are again separated in the lateral sense by means of a diverging conveyor unit 33 which delivers the dough pieces to a special molding conveyor 5. The diverging conveyor unit 33 consists of several narrow conveyor belts arranged side by side, but running at slightly divergent angles, thereby increasing the lateral distances between the several rows of dough pieces which move from the discharge station 31 to the molding conveyor 5. The diverging rows of dough pieces 32 can best be seen in FIG. 2.

Behind the molding conveyor 5 is arranged a displaceable conveyor unit 8, constructed in the preferred embodiment as an upwardly pivotable conveyor belt. Its pivotability is reflected by the arrow 34 (see also FIG. 3).

Immediately underneath the molding conveyor 5 and the cooperating pivotable conveyor 8, and normally covered by the latter, is arranged a horizontal chain conveyor 10. While the upper conveyors 5 and 8 of the main molding line are driven for conveyance of the dough pieces 32 away from the proofing cabinet 1, the lower chain conveyor 10 is driven in the opposite direction, i.e. towards the proofing cabinet 1. As can readily be seen from the configuration of FIG. 1, the chain conveyor 10 only receives dough pieces, when the pivotable conveyor 8 is raised; the raised position is shown in FIG. 3. The operation of the chain conveyor 10 will therefore be described in more detail further below, in connection with the operational configuration of FIGS. 3 and 4.

Succeeding the upwardly pivotable conveyor belt 8 is a first rolling station 11 which delivers the flattened dough pieces to a right-angle dough piece transfer device 12, by means of which the several rows of dough pieces travelling on the longitudinal main molding line are transferred onto a transverse molding line which runs perpendicularly to the travel direction of the longitudinal molding line and dough piece transfer device 12. The latter device will be described in more detail further below, in connection with FIG. 5.

In FIGS. 7 and 8 is illustrated a transverse molding line, starting underneath the earlier-mentioned right-angle transfer device 12 and including a final proofing cabinet 37, from where the molded and proofed dough pieces pass directly into a baking oven 41 of the tunnel oven type. A first conveyor belt 35 receives the partially molded dough pieces from the transfer device 12 of the longitudinal main molding line and carries them to a rolling station 36. An intermediate conveyor belt 55 deposits the fully molded flat dough pieces onto suitable carrier members of a suspended proofing train 38 of the end proofing cabinet 37. The path of the proofing train 38 is indicated schematically by the lines 38 and the guide rollers 39. A short transfer conveyor 40 receives the proofed dough pieces from the proofing train 38 and deposits them on the conveyor of a baking oven 41.

Referring again to FIG. 1 of the drawing, there can be seen that the special molding belt 5 is associated with a vertically adjustable upper molding belt 4. The latter runs in opposite direction to the lower molding belt 5 and is driven continuously. Only for the production of round bread is the upper molding belt 4 not needed, in which case it is adjusted to a level above the lower molding belt 5 at which it will not touch the dough pieces carried by the lower molding belt 5. On the other hand, when loaf bread is to be molded, the upper molding belt 4 is lowered to a position in which the arriving dough pieces 32 are engaged by both molding belts and rotated therebetween, as the upper belt 4 travels in opposite direction to the lower belt 5. The speed of the upper molding belt 4 may be varied, so as to increase or decrease the effective distance over which the roll molding action takes place. For certain purposes, the upper molding belt 4 may be replaced by a simple non-driven molding belt.

The operative configuration of the dough makeup line, as adjusted for the production of flat bread is shown in FIGS. 1 and 2, where the pivotable conveyor belt 8 is shown in its horizontal position. In this configuration, the makeup line operates preferably with intermittant motion. The molding belt 5, which may be driven for continuous motion when loaves are to be produced, is likewise driven with intermittant motion. The purpose of using intermittant motion is to assure that irregular delivery positions on the diverging conveyor 33 will be corrected, in order to obtain lateral alignment of the dough pieces 32 in all the dough piece rows. Irregular dough piece delivery positions may result from delays in the dough piece transfer, due to excessive adherence of certain dough pieces to the pockets of the proofing train. The transverse alignment of the dough pieces 32 in the dough piece rows is important, in order to assure the proper positioning of the dough pieces on the conveyor 35 of the transverse molding line, following transfer by the right-angle dough piece transfer device 12.

The pivotable conveyor belt 8, receiving the dough pieces from the molding belt 5, feeds them to a first rolling station 11, where the round dough pieces are flattened and stretched in the longitudinal direction. From the rolling station 11, the dough pieces pass onto the belt of the right-angle dough piece delivery device 12 which deposits the dough pieces on the transverse conveyor belt 35. The latter will be discussed in more detail further below, in connection with FIG. 5.

The transverse conveyor belt 35 feeds the partially flattened dough pieces to a second rolling station 36 (see FIG. 7), where the dough pieces are further flattened and stretched in a direction perpendicular to the first rolling and stretching operation. Thus, while both rolling stations stretch the dough pieces in the direction of conveyor advance, the perpendicularity between the two directions produces a substantially circular final shape of the dough pieces. If an oval shape of the flat bread is desired, this is easily accomplished by correspondingly adjusting the rolling gaps between the rollers of the rolling station 11 and/or of the rolling station 36.

Following the final molding operation in the rolling station 36, the flattened dough pieces travel on a conveyor belt 55 to the final proofing cabinet 37, from where they are transferred automatically to the continuously operating baking oven 41.

For the production of other than flat bread, i.e. when round bread or loaf bread is to be made up for baking, the dough makeup line is switched to the configuration of FIGS. 3 and 4, by simply raising the pivotable conveyor belt 8 to the position shown in FIG. 3. In this makeup mode, the molding belt 5 may be driven continuously or, preferably, intermittently, if more than one dough piece is to be placed on the baking palettes 9 which are conveyed by the chain conveyor 10. The intermittent motion produces a precise positioning of the molded dough pieces on the baking palettes 9 which are being conveyed underneath the molding belt 5 by the likewise intermittently advancing chain conveyor 10. For the accommodation of a greater or smaller number of dough pieces on a standardized baking palette, the chain conveyor has appropriately adjustable drive linkages which determine the distance of conveyor advance per movement cycle. The chain conveyor 10, moving in the direction towards the proofing cabinet 1, transfers the loaded baking palettes 9 onto a driven friction roller unit 24, by means of which the baking palettes are further advanced onto a loading station for a transverse conveyor 26, where an arriving baking palette 9 actuates a limit switch 42, thereby automatically starting up the transverse conveyor 26 for the lateral removal of the loaded baking palettes 9 from the dough makeup line (FIG. 4).

The entire dough makeup line is preferably operationally synchronized, the timing of each operational unit of the line being adjusted for smooth cooperation with adjacent units, while being locked into the overall operational cycle of the makeup line. The positive synchronization extends to the point where the molded dough pieces are transferred to the continuously operating baking oven 41. It should be understood that positive synchronization need not be limited to positive mechanical drive connections, but could also be accomplished by means of photoelectric cells and/or proximity switches.

The controlling operational unit, as far as mechanical synchronization of the makeup line is concerned, is the head unit 28, whose dough dividing rate determines the operating speed of the entire dough makeup line. The setting of the head unit 28 also determines the number of dough piece rows which are to be made up simultaneously by the equipment. In the embodiment illustrated in the drawings, the head unit 28 and the various other operational units of the makeup line process six rows of dough pieces simultaneously. This number can be further increased or decreased, if necessary. An identical number of dough piece rows are also arranged on the transverse molding line (see FIG. 8). However, the number of dough piece rows on the transverse molding line is not determined by the head unit 28, but depends on the transfer motion adjusted on the right-angle dough piece transfer device 12. Thus, while it is convenient to use an equal number of dough piece rows in the longitudinal molding line and in the transverse molding line, the transfer device 12 could be easily adjusted to create more or fewer rows on the transverse conveyor 35.

In FIG. 5 is shown a detailed elevational view of the right-angle dough piece transfer device 12 of the dough piece makeup line of the invention. As the drawing indicates, the transfer device 12 follows immediately the rolling station 11 which, in turn, follows the upwardly pivotable conveyor unit 8. The purpose of the right-angle transfer device 12 is to transfer to the transverse conveyor 35 the partially flattened dough pieces, as they arrive in several aligned rows from the longitudinal molding line, and to create similar multiple rows on the conveyor 35 of the transverse molding line, without buckling or otherwise distorting the dough pieces in the process.

In the example of the embodiment shown in the drawings, the right-angle dough piece transfer device 12 receives six rows of dough pieces on the transverse molding line. While this is a convenient configuration, it will be readily understood that the right-angle transfer, in creating transversely oriented dough piece rows on the conveyor 35, does not transfer the dough pieces of each longitudinal row into a similar transverse row, but joins transversely aligned dough pieces of all longitudinal rows to add them to a single transverse row, advancing from row to row. Thus, it would be easy to increase or decrease the number of dough piece rows on the transverse conveyor 35 as desired. In the example illustrated, thirty-six dough pieces are deposited in six transverse dough piece rows on conveyor 35, before the latter advances by a distance equal to six times the spacing between the dough piece rows on the longitudinal molding line.

Underneath the longitudinal molding line extends a longitudinal main drive shaft 15 which is connected to and driven by the head unit drive (not shown). The main drive shaft extends to a bevel gear drive 16, where it drives a transversely oriented drive shaft for the transverse dough piece molding line.

The transverse drive shaft is operatively connected to a likewise transversely oriented control shaft 17 which, in turn, drives a control disc 19, using a pair of spur gears. This drive arrangement is shown in more detail in FIG. 6. There, it can be seen that the control disc 19 carries a switching cam 20 which actuates a control switch 21 at a predetermined angular position of the control disc 19. The switch 21 controls an electric motor 23 (FIG. 5) of a translational drive by means of which the upper end lower loops of the transfer belt 12' are advanced and retracted, respectively, as shown in FIG. 5.

In the case at hand, where the right-angle transfer device 12 deposits six rows of dough pieces on the transverse conveyor 35, the control disc 19 is geared to the control shaft 17 so as to execute one revolution, while the longitudinal drive shaft and the control shaft execute six revolutions. Once started by the control switch 21, the translational drive 23' moves the transfer belt 12' across the transverse conveyor 35, from right to left in FIG. 5, until a cam on the translation drive actuates the reversing switch 44 for the motor 23, which then returns the transfer belt to its starting position, where it is stopped by the limit switch 43, until restarted by the control cam 21 on the control disc 19. An increase or decrease in the number of rows of dough pieces deposited on the transverse conveyor belt 35 would thus simply require a corresponding change in the gear transmission ration between the control shaft 17 and the control disc 19.

The right-angle dough piece transfer device 12 of FIG. 5 operates as follows: The translational drive 23' for the transfer belt 12' is normally at rest, when the transfer edge 12" of the belt is fully extended over the transverse conveyor 35. The transfer movement of the transfer belt 12', involving a retraction of the upper loop of the transfer belt 12' and a corresponding advance of the lower loop by means of the translational drive 23', must start when the first line of dough pieces reach the transfer edge 12'. This means that the control cam 20 on the control disc 19 must at this point actuate the control switch 21. If this is not the case, an appropriate angular adjustment of the control disc 19 will be necessary. This can be accomplished by means of the device shown in FIG. 6a, where it can be seen that the control disc 19 is mounted on an axially movable arbor 46, by means of which the gear teeth of the control disc 19 can be disengaged from the small gear 18, on the control shaft 17, for an angular repositioning of the control cam 20. The knob 47 on the arbor 46 is used to control the disengagement and reengagement of the gears and to retain them in their engaged position with the aid of a bayonet-type lock.

At the moment at which the leading dough pieces have reached the transfer edge 12" of the transfer device 12, six rows of six dough pieces each are positioned on the transfer belt 12' above the transverse conveyor 35, ready for transfer. The actuation of the motor 23 of the translational drive 23' by the control switch 21 now causes the transfer edge 12' to be retracted to the left from under the dough pices, while a pickup loop of the transfer belt 12' executes a corresponding motion in the opposite direction to maintain the belt 12' under tension. Having reached the reversing switch 44, the carrier member of the pickup loop of the transfer belt 12' activates that switch, thereby reversing the translational drive motor 23.

In FIG. 5 is further shown a disconnect coupling 16, arranged on the transverse drive shaft 49, by means of which the latter can be disconnected from the main drive shaft 15 so as to shut down the transverse dough piece molding line and its final proofing unit 37, while the main drive shaft 15 continues to rotate. A manually operable coupling lever 51 is used to disengage and reengage the shaft coupling 16. The latter is of the dog clutch type and arranged to reengage the coupling members in only a predetermined angular position, so as to maintain the timing relationship between the two drive shafts 15 and 49.

The dough piece makeup line of the invention, as described, lends itself ideally for a quick conversion, without shutdown, from the production of one kind of bread to another, so that it becomes possible, for example, to switch the makeup line repeatedly from the production of flat bread to that of loaf bread, while simultaneously operating separate baking ovens for the two kinds of bread.

As has been described in the foregoing, the switchover from the production of flat bread on the longitudinal and transverse molding lines to the production of round bread or loaf bread requires that the pivotable conveyor unit 8 be raised, that the chain conveyor 10 be started up, and that the upper molding belt 4 be adjusted for the particular bread shape. As soon as the last flat-molded dough pieces have left the final proofing unit 37, the shaft coupling 16 is disconnected, by actuating the coupling lever 51, thereby shutting down the transverse molding line. The right-angle dough piece transfer device 12, whose belt is driven by the motor 45 which also drives the rolling station 11, and the motor 23 for the translational drive of the transfer device 12 are automatically disconnected, when the pivotable conveyor unit 8 is raised.

This convertibility of the dough makeup line without shutdown makes it possible to operate the head unit at its maximum capacity, which may be greater than the capacity of one baking oven alone. It also makes it possible to quickly adjust the bakery output to any short term changes in the demand pattern for the one or the other kind of bread.

Following the conversion of the dough makeup line from the production of flat bread to the production of loaves, for example, as illustrated in FIGS. 3 and 4, the chain conveyor 10 runs intermittently, carrying baking palettes 9 towards the transverse conveyor 26. The loaded baking palettes 9, after being pushed onto a transfer station by means of the friction roller drive 24, actuate the switch 42, whereupon the transverse conveyor 26 removes the baking palettes laterally, as shown in FIG. 4. From there, the baking palettes are transferred to a baking oven, using either manual labor or a suitable transfer conveyor.

The chain conveyor 10 for the baking palettes 9 includes suitable adjustment means for the adjustment of the conveyor advance during each operational cycle, the length of advance depending on the number of dough pieces which are to be deposited on each baking palette 9. For this purpose, the chain conveyor drive (not shown) is equipped with an adjustable drive disc and drive linkage. Round dough pieces have to be spaced further apart in the longitudinal direction than loaf-shaped dough pieces of equal weight. For the production of loaves, the molding belts 4 and 5 may be driven continuously, while the chain conveyor operates in each case intermittently, in order to assure a proper positioning of the loaves on the baking palettes 9.

Whenever round dough pieces are being produced, the upper molding belt 4 will not be needed. For this case, the upper molding belt 4 may be pivotable upwardly, similar to the pivotable conveyor unit 8, using the center of the entry guide roller as a pivot axis. The passing dough pieces are then just slightly pressed against the lower molding belt 5, as they pass under the entry guide roller. Alternatively, the upper molding belt 4 may be adjustable vertically, while remaining horizontally oriented, as implied by the arrow in FIGS. 1 and 3.

It should be understood, of course, that the foregoing disclosure describes only a preferred embodiment of the invention and that it is intended to cover all changes and modifications of this example of the invention which fall within the scope of the appended claims.

I claim the following:

1. A convertible dough makeup line for the mechanized processing of a mass of bread dough into dough pieces of at least two different shapes, in the selective production of different kinds of bread in a production line baking operation, the dough makeup line comprising in combination:

a head unit, including means for dividing the bread dough into a regular succession of dough pieces and means for rounding the dough pieces;

a proofing unit succeeding the head unit in the sense of dough piece conveyance, the proofing unit including means for receiving the rounded dough pieces from the head unit, for proofing them, and for delivering proofed dough pieces at a discharge station;

a first dough piece molding line succeeding the proofing unit, said line including means for conveying the dough pieces and simultaneously shaping them into loaves, said means being adjustable so as to convey the dough pieces without reshaping them;

a second dough piece molding line including means for conveying the dough pieces and simultaneously shaping them to a flat shape, the second dough piece molding line being arranged behind the first dough piece molding line, in the sense of dough piece conveyance;

a displaceable conveyor unit arranged between said first and second dough piece molding lines; the displaceable conveyor unit being movable between a transfer position in which it transfers the dough pieces from the first dough piece molding line to the second dough piece molding line and a position in which the dough pieces are allowed to fall from the first dough piece molding line; and means arranged underneath the first dough piece molding line for receiving the falling dough pieces and for removing them to a baking oven.

2. A convertible dough makeup line as defined in claim 1, wherein
   the head unit, the proofing unit, the first and second dough piece molding lines, and the displaceable conveyor are arranged to convey several rows of dough pieces side by side.

3. A convertible dough makeup line as defined in claim 1, wherein
   the displaceable conveyor unit is an endless conveyor belt, having front and rear guide rollers; and
   the endless conveyor belt is upwardly pivotable about the axis of its rear guide roller.

4. A convertible dough makeup line as defined in claim 1, wherein
   said dough piece receiving and removing means includes a chain conveyor arranged underneath the first dough piece molding line and a series of baking palettes conveyed thereon, so as to receive the dough pieces falling from said line.

5. A convertible dough makeup line as defined in claim 4, wherein
   the chain conveyor includes an intermittently operating drive and is oriented in alignment with the first dough piece molding line, but carries the baking palettes in the opposite direction, towards the proofing unit.

6. A convertible dough makeup line as defined in claim 5, wherein
   said dough piece receiving and removing means further includes a transfer station arranged near the proofing unit, in operative alignment with the chain conveyor;

a driven friction roller unit arranged between the chain conveyor and the transfer station; and a transversely oriented palette takeaway conveyor travelling through the transfer station; the transfer station including a palette-actuatable electrical switch controlling the startup of the palette takeaway conveyor.

7. A convertible dough makeup line as defined in claim 1, wherein the first dough piece molding line includes an endless lower molding belt in alignment with the displaceable conveyor unit, when the latter is in its transfer position, and a cooperating counter-rotating endless upper molding belt whose position is vertically adjustable in relation to said lower belt; and the upper molding belt has drive means for continuous rotation, while the lower molding belt has drive means for selective continuous rotation and intermittant rotation of the belt.

8. A convertible dough makeup line as defined in claim 1, wherein the second dough piece molding line includes a longitudinal dough piece molding line portion, leading to a transverse dough piece molding line portion, and a right-angle dough piece transfer device arranged at the end of the longitudinal line portion, for the transfer of the dough pieces from the latter to the transverse line portion; and the two molding line portions include each at least one rolling station with an adjustable rolling gap, for the flattening and stretching of the passing dough pieces, first in the longitudinal direction, and then in the transverse direction.

9. A convertible dough makeup line as defined in claim 8, wherein the right-angle dough piece transfer device includes an intermittently driven endless transfer belt with an upper horizontal belt loop extending above the transverse dough piece molding line portion and a lower horizontal belt take-up loop extending therebelow, and means for retracting the upper loop while the transfer belt stands still in the rotational sense, thereby pulling the upper belt loop away from under the dough pieces which it carries and dropping the latter onto the transverse line.

10. A convertible dough makeup line as defined in claim 9, wherein the right-angle dough piece transfer device is arranged to simultaneously receive a plurality of parallel moving longitudinal rows of dough pieces and to simultaneously transfer dough pieces of all rows onto said transverse line, in a predetermined number of transverse rows of dough pieces.

11. A convertible dough makeup line as defined in claim 10, further comprising an intermittently operating makeup line drive interconnecting and driving in a timed relationship the first and second dough piece molding lines and said transfer belt;

said drive including a transfer control member actuating the transfer belt retracting means, whenever the leading dough pieces on the transfer belt have reached a position in superposed alignment with the farthest transverse row of dough pieces on said transverse line portion.

12. A convertible dough makeup line as defined in claim 11, wherein the transfer belt retracting means includes an electric motor controlled by a starting switch;

the transfer control member is a rotating control disc with a peripheral control cam actuating said start switch, when reaching a predetermined angular position; and said control disc is rotationally connected to the makeup line drive, rotating at a speed which is as many times slower than the speed of the makeup line as the transverse molding line portion has dough piece rows moving thereon.

13. A convertible dough makeup line as defined in claim 12, wherein the angular drive relationship between the control disc and the makeup line drive is resettable for an adjustment of the timing of the start of transfer belt retraction in relation to the longitudinal position of the dough pieces on the transfer belt.

14. A convertible dough makeup line as defined in claim 11, wherein the makeup line drive includes a longitudinal main drive shaft arranged underneath the longitudinal molding line portion, and a transverse drive shaft arranged underneath the transverse molding line portion;

the two drive shafts are connected by means of bevel gears and include a disengageable coupling for the shutdown of the transverse molding line portion.

15. A convertible dough makeup line as defined in claim 14, wherein the disengageable coupling is of the dog clutch type, having coupling members which allow for reengagement of the coupling in only a fixed angular relationship between the two drive shafts.

* * * * *